US012519240B2

(12) United States Patent
Hasegawa

(10) Patent No.: US 12,519,240 B2

(45) Date of Patent: Jan. 6, 2026

(54) ANTENNA SUBSTRATE

(71) Applicant: Fujikura Ltd., Tokyo (JP)

(72) Inventor: Yuta Hasegawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 127 days.

(21) Appl. No.: 18/018,349

(22) PCT Filed: Aug. 17, 2022

(86) PCT No.: PCT/JP2022/031060
§ 371 (c)(1),
(2) Date: Jan. 27, 2023

(87) PCT Pub. No.: WO2023/188450
PCT Pub. Date: Oct. 5, 2023

(65) Prior Publication Data

US 2024/0258700 A1 Aug. 1, 2024

(30) Foreign Application Priority Data

Mar. 28, 2022 (JP) ................................ 2022-052340

(51) Int. Cl.
*H01Q 9/04* (2006.01)
*H01Q 1/48* (2006.01)

(52) U.S. Cl.
CPC ............... *H01Q 9/045* (2013.01); *H01Q 1/48* (2013.01)

(58) Field of Classification Search
CPC ........... H01Q 9/045; H01Q 1/48; G06K 19/06
See application file for complete search history.

(56) References Cited

U.S. PATENT DOCUMENTS 8,256,685 B2 * 9/2012 Chen .................... H01Q 1/2283 235/492
9,391,375 B1 * 7/2016 Bales .................. H01Q 21/064
9,865,928 B2 * 1/2018 Sudo ........................ H01Q 1/38
(Continued)

FOREIGN PATENT DOCUMENTS

CN 112838361 A 5/2021
CN 215834716 U 2/2022
(Continued)

OTHER PUBLICATIONS

International Search Report dated Nov. 8, 2022 issued in counterpart International Application No. PCT/JP2022/031060.

*Primary Examiner* — Dieu Hien T Duong
*Assistant Examiner* — Austin M Back
(74) *Attorney, Agent, or Firm* — WHDA, LLP

(57) ABSTRACT

An antenna substrate includes an antenna, a ground member arranged at an interval from the antenna in a thickness direction, and a feed line layer located between the antenna and the ground member in the thickness direction. An intermediate ground member electrically connected to the ground member and a feed line are arranged on the feed line layer. An excitation slit extending in a direction orthogonal to the thickness direction and a line slit extending in a direction orthogonal to both the direction in which the excitation slit extends and the thickness direction are formed in the intermediate ground member. The feed line is located inside of the line slit. The excitation slit extends to intersect the feed line as seen in the thickness direction.

8 Claims, 6 Drawing Sheets

(56) References Cited

U.S. PATENT DOCUMENTS

| | | | | |
|---|---|---|---|---|
| 11,791,544 | B2 * | 10/2023 | Rogers | H01Q 1/38<br>343/702 |
| 2018/0097288 | A1 * | 4/2018 | DiDomenico | G06V 20/13 |
| 2020/0052405 | A1 | 2/2020 | Park et al. | |
| 2020/0067183 | A1 * | 2/2020 | Chang | H01Q 21/24 |
| 2021/0203069 | A1 | 7/2021 | Park et al. | |
| 2022/0209411 | A1 | 6/2022 | Che et al. | |

FOREIGN PATENT DOCUMENTS

| | | | |
|---|---|---|---|
| JP | 2021-526748 | A | 10/2021 |
| WO | 2020/127854 | A1 | 6/2020 |

* cited by examiner

ANTENNA SUBSTRATE

TECHNICAL FIELD

The present invention relates to an antenna substrate.

Priority is claimed on Japanese Patent Application No. 2022-052340, filed Mar. 28, 2022, the content of which is incorporated herein by reference.

BACKGROUND ART

In Patent Document 1, an antenna substrate including an antenna, a feed line layer, and a ground member is disclosed. A slit is formed in the ground member. When an electric current is supplied to the ground member via the feed line layer, the slit is excited and electromagnetic waves are generated. The electromagnetic waves generated in the slit reach the antenna and are radiated outside of the antenna substrate via the antenna.

CITATION LIST

Patent Document

[Patent Document 1]
U.S. Pat. No. 8,256,685

SUMMARY OF INVENTION

Technical Problem

For example, in the antenna substrate described in Patent Document 1, the ground member is not provided outside of the antenna substrate in a thickness direction as seen from the slit that is a location where the electromagnetic waves are generated. Therefore, some of the electromagnetic waves generated in the slit do not reach the antenna or are not reflected by the ground member and there is a possibility that the electromagnetic waves will leak unintentionally toward the outside of the antenna substrate (the feed line layer side).

Here, in order to prevent the above-described leakage of electromagnetic waves, for example, in the antenna substrate described in Patent Document 1, a new ground member may be added below the feed line layer. However, simply adding the ground member as described above increases a thickness of the antenna substrate.

The present invention has been made in consideration of the above circumstances and an objective of the present invention is to provide an antenna substrate capable of suppressing an increase in thickness while suppressing leakage of electromagnetic waves.

Solution to Problem

According to a first aspect of the present invention for achieving the above-described objective, there is provided an antenna substrate including: at least one antenna; a ground member arranged at an interval from each of the at least one antenna in a thickness direction; and at least one feed line layer located between each of the at least one antenna and the ground member in the thickness direction, wherein an intermediate ground member electrically connected to the ground member and a feed line are arranged on each of the at least one feed line layer, wherein an excitation slit extending in a direction orthogonal to the thickness direction and a line slit extending in a direction orthogonal to both the direction in which the excitation slit extends and the thickness direction are formed in the intermediate ground member, wherein, in each of the at least one feed line layer, the feed line is located inside of the line slit, and wherein, in each of the at least one feed line layer, the excitation slit extends to intersect the feed line as seen in the thickness direction.

According to the antenna substrate according to the first aspect of the present invention, because the excitation slit extends to intersect the feed line, the excitation slit can be excited by supplying an electric current to the feed line and electromagnetic waves can be generated. Here, when some of the electromagnetic waves generated by the excitation slit propagate toward the opposite side of the antenna, the electromagnetic waves are reflected by the ground member. Therefore, it is possible to suppress the leakage of electromagnetic waves to the outside of the antenna substrate. Also, because the feed line and the intermediate ground member are located in the same layer, an increase in the thickness of the antenna substrate can be suppressed.

In an antenna substrate according to a second aspect of the present invention, in the antenna substrate according to the first aspect, in each of the at least one feed line layer, the excitation slit extends to penetrate the intermediate ground member.

According to a third aspect of the present invention, in the antenna substrate according to the first or second aspect, in each of the at least one feed line layer, the line slit extends to penetrate the intermediate ground member.

In an antenna substrate according to a fourth aspect of the present invention, the antenna substrate according to any one of the first to third aspects includes two or more of the feed line layers.

In an antenna substrate according to a fifth aspect of the present invention, in the antenna substrate according to any one of the first to fourth aspects, when an antenna closest to the ground member in the thickness direction in the at least one antenna is referred to as a bottom antenna and a feed line layer farthest from the ground member in the thickness direction in the at least one feed line layer is referred to as a top feed line layer, a distance between the bottom antenna and the top feed line layer in the thickness direction is longer than a distance between the top feed line layer and the ground member in the thickness direction.

In an antenna substrate according to a sixth aspect of the present invention, in the antenna substrate according to any one of the first to fifth aspects, in each of the at least one feed line layer, a distance between the feed line and the intermediate ground member is shorter than a distance between each of the at least one feed line layer and the ground member in the thickness direction.

In an antenna substrate according to a seventh aspect of the present invention, the antenna substrate according to any one of the first to sixth aspects further includes: a feed element configured to supply an electric current to the feed line; a wiring path configured to electrically connect the feed element and the feed line: and a wiring layer, wherein the ground member is arranged to be located between the wiring layer and each of the at least one feed line layer in the thickness direction, and wherein at least a part of the wiring path is arranged on the wiring layer.

Advantageous Effects of Invention

According to the above-described aspect of the present invention, it is possible to provide an antenna substrate capable of suppressing an increase in thickness while suppressing leakage of electromagnetic waves.

DESCRIPTION OF EMBODIMENTS

Hereinafter, an antenna substrate according to the embodiment of the present invention will be described with reference to the drawings.

Figure 1:
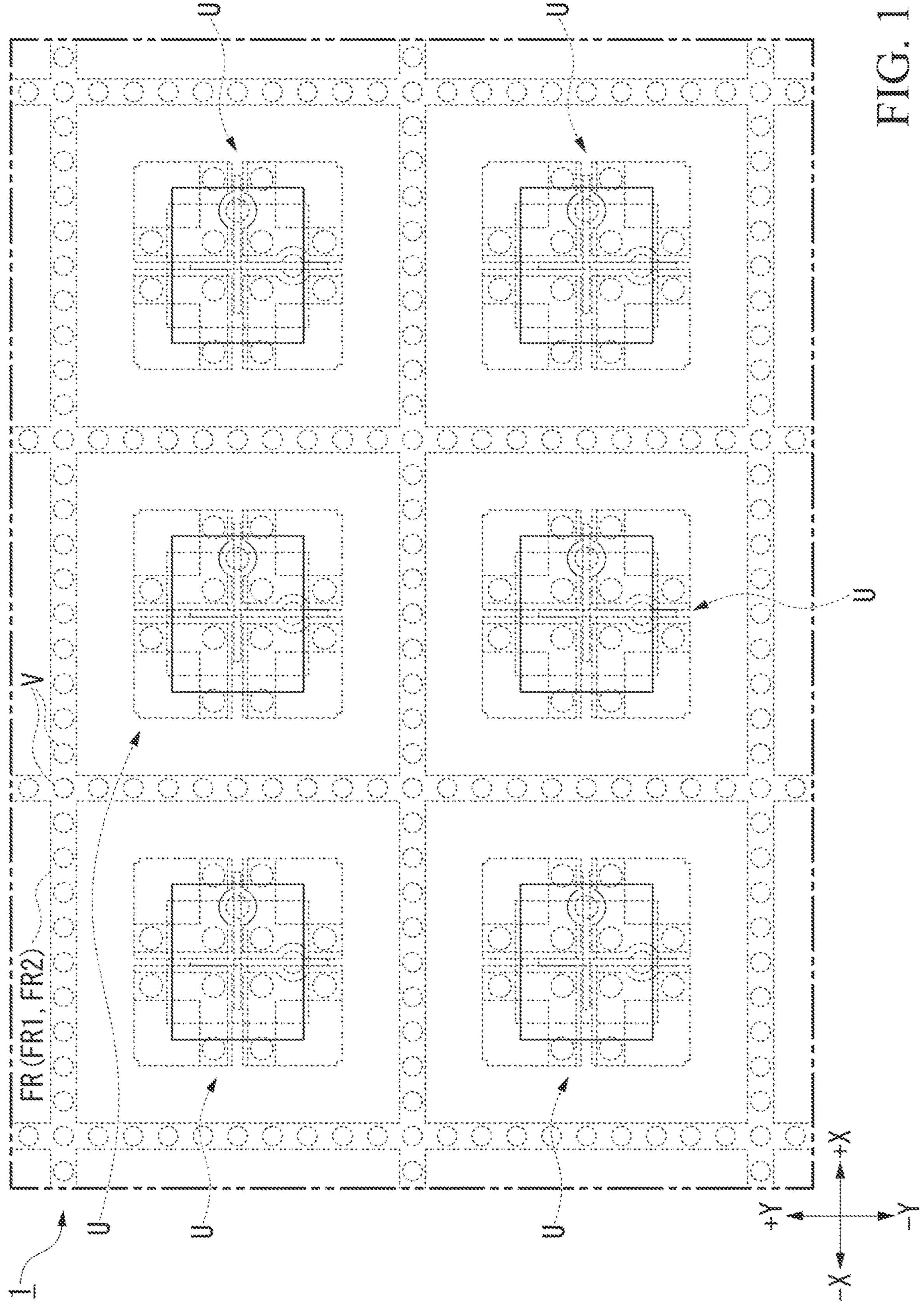
FIG. 1 is a plan view showing an antenna substrate according to an embodiment of the present invention.

As shown in FIG. 1, an antenna substrate 1 according to the present embodiment includes a plurality of antenna units U. The plurality of antenna units U are two-dimensionally arranged to constitute an array antenna. The plurality of antenna units U according to the present embodiment are separated from each other by a frame FR extending in a grid shape.

Figure 2:
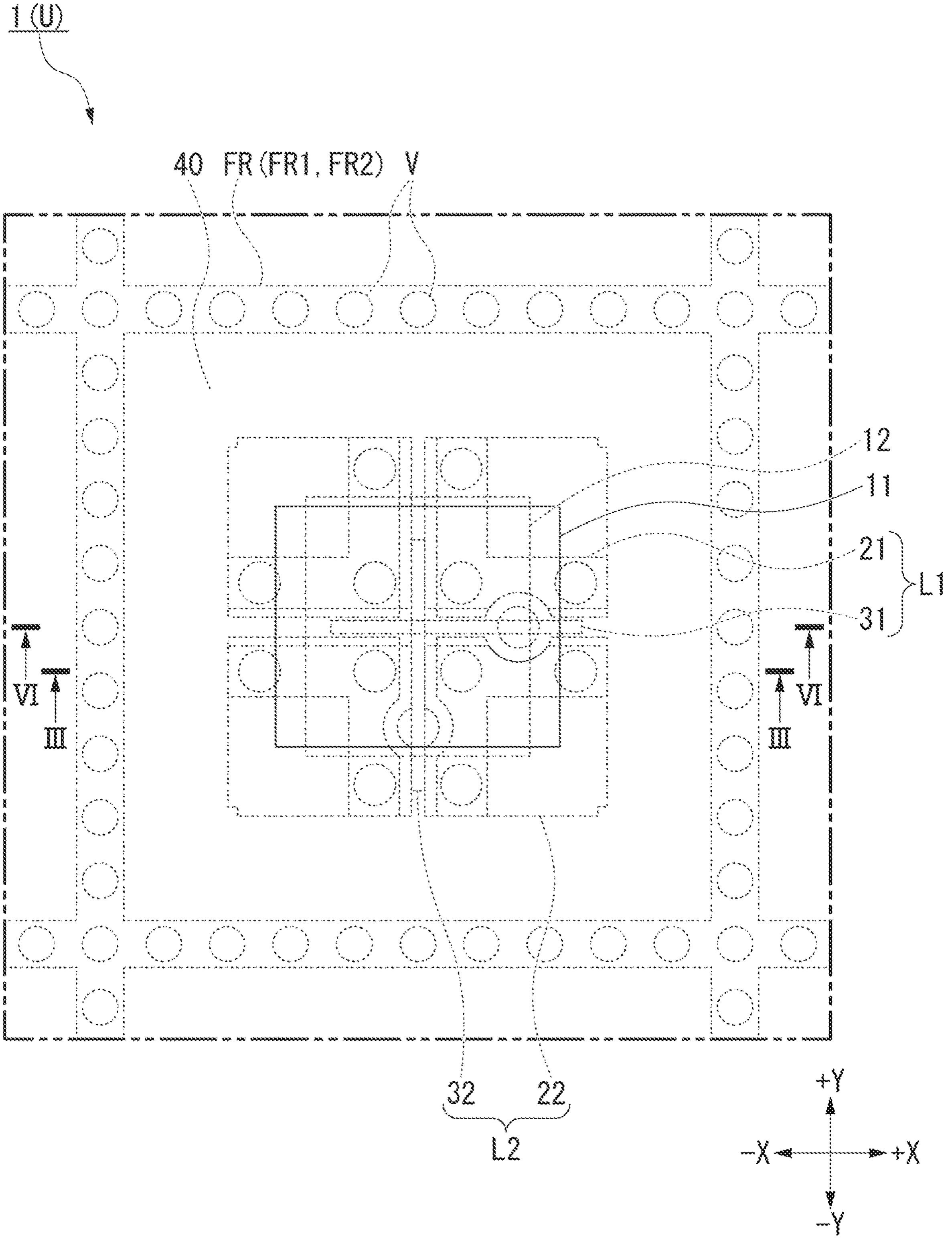
FIG. 2 is a plan view showing an antenna unit according to the embodiment of the present invention.
Figure 3:
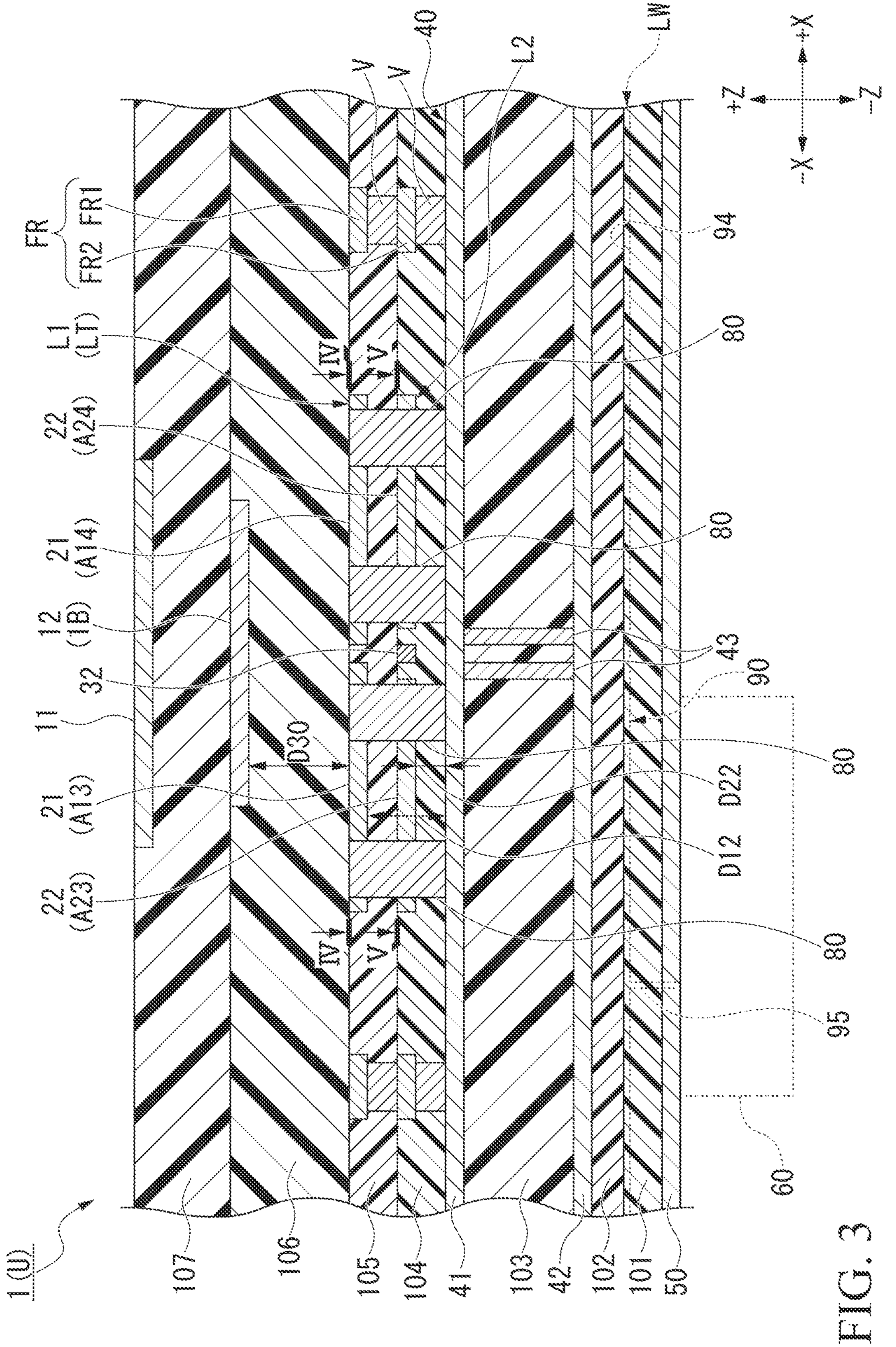
FIG. 3 is a cross-sectional view taken along line III-III shown in FIG. 2.

As shown in FIG. 2, each antenna unit U includes a first antenna 11, a second antenna 12, a first feed line layer L1, and a second feed line layer L2. Also, as shown in FIG. 3, the antenna substrate 1 includes a ground member 40, a second ground member 50, a feed element 60, and a wiring layer LW. In the present embodiment, the ground member 40, the second ground member 50, the feed element 60, and the wiring layer LW are shared by the plurality of antenna units U. Also, a plurality of insulating layers 101 to 107 are arranged in gaps between the antennas 11 and 12, the feed line layers L1 and L2, the ground member 40, the second ground member 50, and the wiring layer LW described above such that the gap is filled therewith.

(Direction Definitions)

Here, in the present description, a thickness direction of the antenna substrate 1 (a direction orthogonal to the antenna substrate 1) is simply referred to as a thickness direction Z. A view in the thickness direction Z is referred to as a plan view. One direction perpendicular to the thickness direction Z is referred to as a first direction X. A direction orthogonal to both the thickness direction Z and the first direction X is referred to as a second direction Y. The frame FR described above extends in the first direction X and the second direction Y. A direction from the ground member 40 to the first antenna 11 in the thickness direction Z is referred to as a +Z-direction or an upward direction. A direction opposite to the +Z-direction is referred to as a −Z-direction or a downward direction. One direction in the first direction X is referred to as a +X-direction or a right direction. A direction opposite to the +X-direction is referred to as a −X-direction or a left direction. One direction in the second direction Y is referred to as a +Y-direction or the backside. A direction opposite to the +Y-direction is referred to as a −Y-direction or the front side.

As shown in FIG. 3, the antenna substrate 1 according to the present embodiment has first to seventh insulating layers 101 to 107. The first to seventh insulating layers 101 to 107 are laminated in that order in the +Z-direction. As the material constituting the insulating layers 101 to 107, for example, a dielectric such as a resin (epoxy or PPE) can be used.

The ground member 40 functions as a ground for the antenna substrate 1. The ground member 40 according to the present embodiment includes an upper ground member 41, a lower ground member 42, and a connection member 43. Each of the upper ground member 41, the lower ground member 42, and the connection member 43 is formed by a conductor. The upper ground member 41 is provided on the upper surface of the third insulating layer 103 and has a flat plate shape. The lower ground member 42 is provided on the lower surface of the third insulating layer 103 (the upper surface of the second insulating layer 102) and has a flat plate shape. The connection member 43 penetrates the third insulating layer 103 in the thickness direction Z, and electrically connects the upper ground member 41 and the lower ground member 42. The connection member 43 is, for example, a via. Also, if the ground member 40 functions as the ground of the antenna substrate 1, the configuration of the ground member 40 can be appropriately changed. For example, the ground member 40 may have only the upper ground member 41.

As shown in FIG. 3, the frame FR according to the present embodiment includes a first frame FR1 and a second frame FR2. Each of the frames FR1 and FR2 extends in a grid pattern in the first direction X and the second direction Y (also see FIGS. 1 and 2). The first frame FR1 according to the present embodiment is located on the upper surface of the fifth insulating layer 105. The second frame FR2 according to the present embodiment is located on the upper surface of the fourth insulating layer 104. The first frame FR1 and the second frame FR2 are electrically connected to the ground member 40 (the upper ground member 41). More specifically, the second frame FR2 and the ground member 40 (the upper ground member 41) are electrically connected through a plurality of vias V formed in the fourth insulating layer 104. Also, the first frame FR1 and the second frame FR2 are electrically connected through the plurality of vias V formed in the fifth insulating layer 105. Thereby, the first frame FR1 is electrically connected to the ground member 40 (the upper ground member 41) via the second frame FR2 and the plurality of vias V. The frame FR suppresses electromagnetic field interference between antenna units U. Also, as long as the interference of the antenna unit U can be suppressed, the configuration of the frame FR can be changed as appropriate. Alternatively, the antenna substrate 1 may not include the frame FR.

The antennas 11 and 12 are a plate-like pattern formed by a conductor and are configured to transmit and receive, for example, a high-frequency radio signal (for example, a band of 28 GHz). In the present embodiment, the first antenna 11 is provided on the upper surface of the seventh insulating layer 107 and the second antenna 12 is provided on the upper surface of the sixth insulating layer 106. However, the antennas 11 and 12 may be configured to perform only transmission or only reception of high-frequency radio signals.

The first feed line layer L1 and the second feed line layer L2 are patterns formed by conductors. The feed line layers L1 and L2 are located between the antennas 11, 12 and the ground member 40 in the thickness direction Z. In the present embodiment, the first feed line layer L1 is provided on the upper surface of the fifth insulating layer 105 and the second feed line layer L2 is provided on the upper surface of the fourth insulating layer 104.

Figure 4:
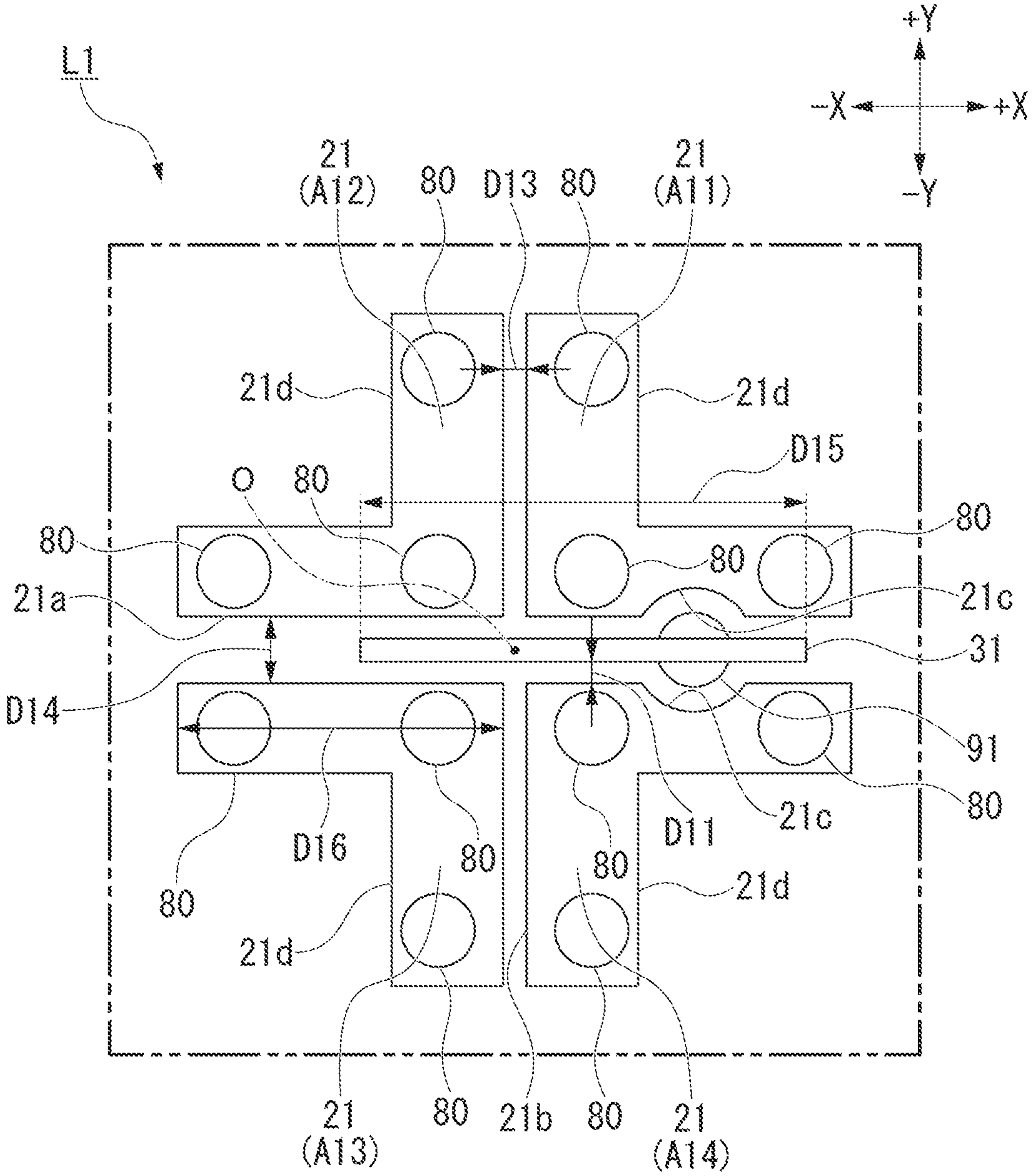
FIG. 4 is a cross-sectional view taken along line IV-IV shown in FIG. 3.

As shown in FIG. 4, a first intermediate ground member 21 and a first feed line 31 are arranged on the first feed line layer L1. The first intermediate ground member 21 has a flat plate-like shape extending in the first direction X and the second direction Y. In the first intermediate ground member 21, a first line slit 21*a* and a first excitation slit 21*b* are formed. The first line slit 21*a* extends in the first direction X such that the first line slit 21*a* penetrates the first intermediate ground members 21 (dividing in an upward/downward direction and more specifically dividing into the first intermediate ground member A11 and the first intermediate ground member A12, and the first intermediate ground member A13 and the first intermediate ground member A14). The first excitation slit 21*b* extends in the second direction Y such that the first excitation slit 21*b* penetrates the first intermediate ground members 21 (dividing in a left/right direction and more specifically dividing into the first intermediate ground member A12 and the first intermediate ground member A13, and the first intermediate ground member A11 and the first intermediate ground member A14). The first line slit 21*a* and the first excitation slit 21*b* intersect at the centerline O extending in the thickness direction Z of the antenna unit U in a plan view.

The slits 21*a* and 21*b* are formed in the first intermediate ground members 21 and the slits 21*a* and 21*b* intersect as described above, and therefore the first intermediate ground members 21 are divided into four conductor pieces (regions). In the present description, the four conductor pieces into which the first intermediate ground members 21 are divided may be referred to as conductor pieces A11 to A14. The conductor piece A11 is a conductor piece of the first intermediate ground member 21 located at the +X-side and the +Y-side. The conductor piece A12 is a conductor piece of the first intermediate ground member 21 located at the −X-side and the +Y-side. The conductor piece A13 is a conductor piece of the first intermediate ground member 21 located at the −X side and the −Y side. The conductor piece A14 is a conductor piece of the first intermediate ground member 21 located at the +X-side and the −Y-side.

In each of the conductor pieces A11 to A14, a notch 21*d* is formed. Four notches 21*d* are located at the corners of the first intermediate ground members 21. In the present embodiment, each notch 21*d* has a rectangular shape. Thereby, each of the conductor pieces A11 to A14 of the first intermediate ground members 21 has an L shape. Also, in the conductor piece A11 and the conductor piece A14 of the first intermediate ground member 21, a recess 21*c* that is recessed outward in the second direction Y from a part of the first line slit 21*a* is formed. The recess 21*c* is formed in the first intermediate ground member 21, and therefore the first intermediate ground member 21 and a first feed via 91 (including a land when the land is formed on the upper part of the first feed via 91) (details thereof will be described below) are prevented from structurally interfering with each other or from being electrically connected.

As shown in FIG. 3, each of the conductor pieces A11 to A14 (the conductor pieces A11 and A12 are not shown) is electrically connected to the ground member 40 through a plurality of conductive vias 80. In the present embodiment, the conductive vias 80 penetrate the first intermediate ground member 21 and the second intermediate ground member 22 in the thickness direction Z. Here, the conductive vias 80 are preferably as close as possible to the slits 21*a* and 21*b* (see FIG. 4). For example, a distance between each conductive via 80 and the slit 21*a* or 21*b* is preferably 1/10 or less of a wavelength of electromagnetic waves transmitted/received by the antenna substrate 1. Thereby, excitation of the first excitation slit 21*b* (details thereof will be described below) can easily occur and the radiation efficiency of the antenna substrate 1 can be increased.

An electric current is supplied to the first feed line 31 by the feed element 60. A path along which the feed element 60 supplies an electric current to the first feed line 31 will be described later. As shown in FIG. 4, the first feed line 31 is located inside of the first line slit 21*a* in the first feed line layer L1.

Thereby, the first feed line 31 and the first intermediate ground member 21 form a coplanar line. More specifically, the first feed line 31, the conductor piece A12, and the conductor piece A13 form one coplanar line, and the first feed line 31, the conductor piece A11, and the conductor piece A14 form one coplanar line.

Also, if the above-described coplanar line can be formed, the first line slit 21*a* may not penetrate the first intermediate ground member 21 in the first direction X. For example, the conductor piece A11 and the conductor piece A14 may be connected at the end of the first intermediate ground member 21 in the +X-direction of the first direction X.

The conductor piece A12 and the conductor piece A13 may be connected at the end of the first intermediate ground member 21 in the −X-direction of the first direction X. However, a configuration in which the first line slit 21*a* penetrates the first intermediate ground member 21 in the first direction X is preferable because excitation of the first excitation slit 21*b* is likely to occur.

The first excitation slit 21*b* extends to intersect the first feed line 31 as seen in the thickness direction Z. In other words, the first feed line 31 extends across the first excitation slit 21*b*. According to this configuration, when an electric current is supplied to the first feed line 31 by the feed element 60, the first excitation slit 21*b* is excited and electromagnetic waves are generated. The electromagnetic waves generated by the first excitation slit 21*b* reach the first antenna 11 (also see FIG. 3) and are radiated outside of the antenna substrate 1 via the first antenna 11.

Also, if the first excitation slit 21*b* can be excited, the first excitation slit 21*b* may not penetrate the first intermediate ground member 21 in the second direction Y. For example, the conductor piece A11 and the conductor piece A12 may be connected at the end of the first intermediate ground member 21 in the +Y-direction of the second direction Y.

At the end of the first intermediate ground member 21 in the −Y-direction of the second direction Y, the conductor piece A13 and the conductor piece A14 may be connected. However, a configuration in which the first excitation slit 21*b* penetrates the first intermediate ground member 21 in the second direction Y is preferable because excitation of the first excitation slit 21*b* is likely to occur.

Also, a distance D11 in the second direction Y between the first feed line 31 and the first intermediate ground member 21 (the conductor piece A11, the conductor piece A12, the conductor piece A13, and the conductor piece A14) may be shorter than a distance D12 between the first feed line layer L1 and the ground member 40 (the upper ground member 41) in the thickness direction Z (also see FIG. 3). According to this configuration, the strength of an electromagnetic field formed in the coplanar line consisting of the first feed line 31 and the first intermediate ground member 21 is greater than the strength of an electromagnetic field formed in a microstrip line consisting of the first feed line 31 and the ground member 40. Therefore, the radiation efficiency of the antenna substrate 1 can be increased. Also, when the distance in the second direction Y between the first feed line 31 and the first intermediate ground member 21 is not constant, an average value of the distance may be defined as the distance D11. Also, the first feed line 31 and the first intermediate ground member 21 are located in the same layer (the first feed line layer L1), and therefore the first excitation slit 21*b* can be efficiently excited.

Also, a width (a dimension in the first direction X) D13 of the first excitation slit 21*b* may be narrower than a width (a dimension in the second direction Y) D14 of the first line slit 21*a*. According to this configuration, the radiation efficiency of the antenna substrate 1 can be further increased. Also, a length (a dimension in the first direction X) D15 of the first feed line 31 may be longer than a dimension D16 of each of the conductor pieces A11 to A14 in the first direction X. According to this configuration, the radiation efficiency of the antenna substrate 1 can be further increased.

Figure 5:
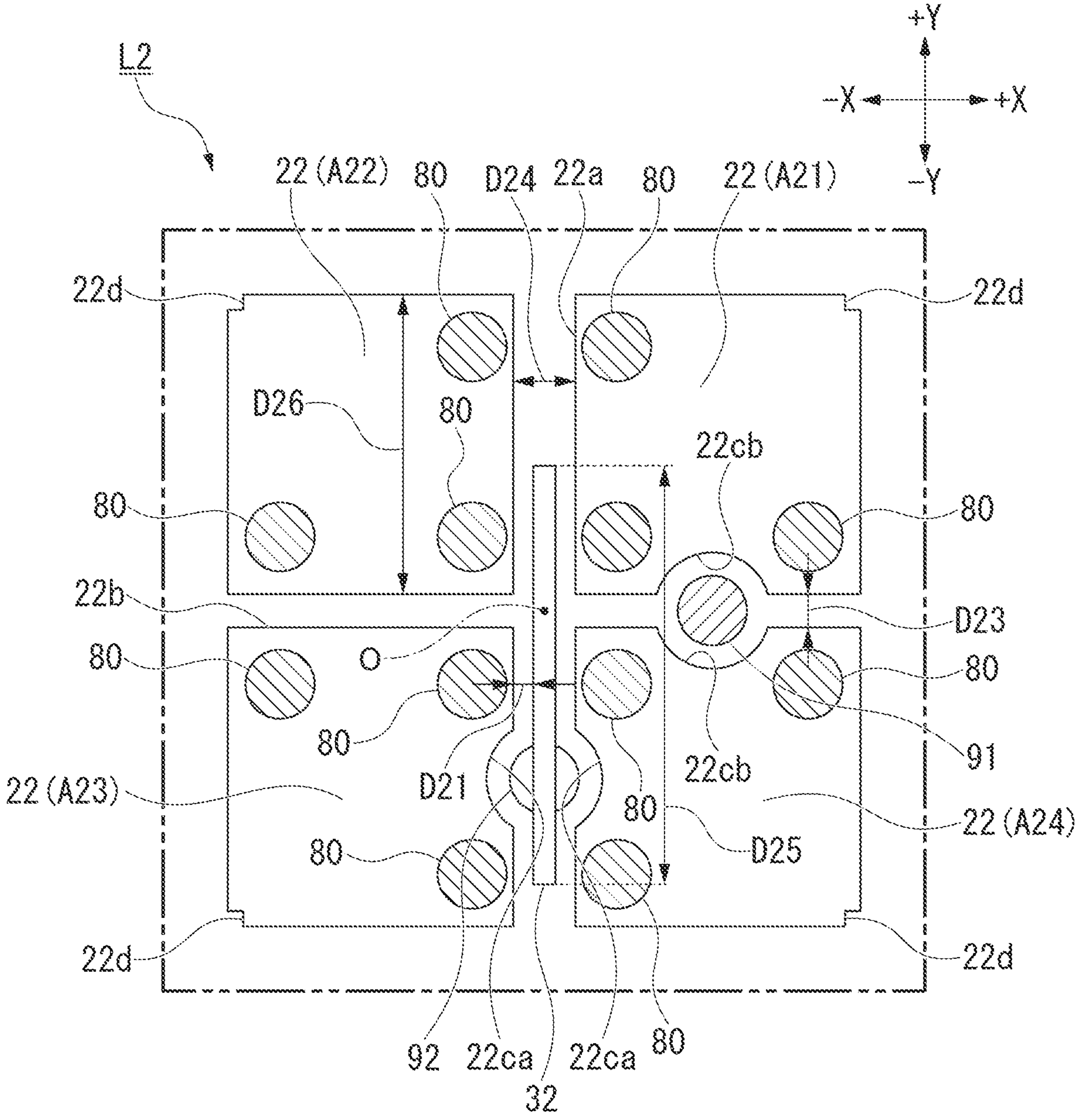
FIG. 5 is a cross-sectional view taken along line V-V shown in FIG. 3.

As shown in FIG. 5, a second intermediate ground member 22 and a second feed line 32 are arranged in the second feed line layer L2. The second intermediate ground member 22 has a flat shape extending in the first direction X and the second direction Y. In the second intermediate ground member 22, the second line slit 22*a* and the second excitation slit 22*b* are formed. The second line slit 22*a* extends in the second direction Y such that the second line slit 22*a* penetrates the second intermediate ground members 22 (dividing in a left/right direction and more specifically dividing into the second intermediate ground member A22 and the second intermediate ground member A23, and the second intermediate ground member A21 and the second intermediate ground member A24). The second excitation slit 22*b* extends in the first direction X such that the second excitation slit 22*b* penetrates the second intermediate ground members 22 (dividing in an upward/downward direction and more specifically dividing into the second intermediate ground member A21 and the second intermediate ground member A22, and the second intermediate ground member A23 and the second intermediate ground member A24). The second line slit 22*a* and the second excitation slit 22*b* intersect at the centerline O extending in the thickness direction Z of the antenna unit U in a plan view.

The slits 22*a* and 22*b* are formed in the second intermediate ground members 22 and the slits 22*a* and 22*b* intersect as described above, and therefore the second intermediate ground members 22 are divided into four conductor pieces (regions). In the present specification, the four conductor pieces into which the second intermediate ground members 22 are divided may be referred to as conductor pieces A21 to A24. The conductor piece A21 is a conductor piece of the second intermediate ground member 22 located at the +X-side and the +Y-side. The conductor piece A22 is a conductor piece of the second intermediate ground member 22 located at the −X-side and the +Y-side. The conductor piece A23 is a conductor piece of the second intermediate ground member 22 located at the −X-side and the −Y-side. The conductor piece A24 is a conductor piece of the second intermediate ground member 22 located at the +X-side and the −Y-side.

In each of the conductor pieces A21 to A24, a notch 22*d* is formed. Four notches 22*d* are located at the corners of the second intermediate ground members 22. In the present embodiment, each notch 22*d* has a rectangular shape. Also, in the conductor piece A23 and the conductor piece A24 of the second intermediate ground members 22, a recess 22*ca* that is recessed outward in the first direction X from a part of the second line slit 22*a* is formed. The recess 22*ca* of the second intermediate ground member 22 is formed, and therefore the second intermediate ground member 22 and a second feed via 92 (including land when the land is formed on the upper part of the second feed via 92) (details thereof will be described below) are prevented from structurally interfering with each other or from being electrically connected. Also, in the conductor piece A21 and the conductor piece A24 of the second intermediate ground members 22, a recess 22*cb* that is recessed outward in the second direction Y from a part of the second excitation slit 22*b* is formed. The recess 22*cb* of the second intermediate ground member 22 is formed, and therefore the second intermediate ground member 22 and the first feed via 91 are prevented from structurally interfering with each other or from being electrically connected.

As shown in FIG. 3, each of the conductor pieces A21 to A24 (the conductor pieces A21 and A22 are not shown) is electrically connected to the ground member 40 through a plurality of conductive vias 80. Here, the conductive vias 80 are preferably as close as possible to the slits 22*a* and 22*b* (see FIG. 5). For example, a distance between each conductive via 80 and the slit 22*a* or 22*b* is preferably 1/10 or less of a wavelength of electromagnetic waves transmitted/received by the antenna substrate 1. Thereby, excitation of the second excitation slit 22*b* (details thereof will be described below) can easily occur and the radiation efficiency of the antenna substrate 1 can be increased.

An electric current is supplied to the second feed line 32 like the first feed line 31 by the feed element 60. A path along which the feed element 60 supplies an electric current to the second feed line 32 will be described below. As shown in FIG. 5, the second feed line 32 is located inside of the second line slit 22*a* in the second feed line layer L2. Thereby, the second feed line 32 and the second intermediate ground member 22 form a coplanar line. More specifically, the second feed line 32 and the conductor pieces A23 and A24 form one coplanar line, and the second feed line 32 and the conductor pieces A21 and A22 form one coplanar line.

Also, if the above-described coplanar line can be formed, the second line slit 22*a* may not penetrate the second intermediate ground member 22 in the second direction Y. For example, the conductor piece A21 and the conductor piece A22 may be connected at the end of the second intermediate ground member 22 in the +Y-direction of the second direction Y.

At the end of the second intermediate ground member 22 in the −Y-direction of the second direction Y, the conductor piece A23 and the conductor piece A24 may be connected. However, a configuration in which the second line slit 22*a* penetrates the second intermediate ground member 22 in the second direction Y is preferable because excitation of the second excitation slit 22*b* is likely to occur.

The second excitation slit 22*b* extends to intersect the second feed line 32 as seen in the thickness direction Z. In other words, the second feed line 32 extends across the second excitation slit 22*b*. According to this configuration, when an electric current is supplied to the second feed line 32 by the feed element 60, the second excitation slit 22*b* is excited and electromagnetic waves are generated. The electromagnetic waves generated by the second excitation slit 22*b* reach the second antenna 12 (also see FIG. 3) and are radiated outside of the antenna substrate 1 via the second antenna 12.

Also, if the second excitation slit 22*b* can be excited, the second excitation slit 22*b* may not penetrate the second intermediate ground member 22 in the first direction X. For example, the conductor piece A21 and the conductor piece A24 may be connected at the end of the second intermediate ground member 22 in the +X-direction of the first direction X.

At the end of the second intermediate ground member 22 in the −X-direction of the first direction X, the conductor piece A22 and the conductor piece A23 may be connected. However, a configuration in which the second excitation slit 22*b* penetrates the second intermediate ground member 22 in the first direction X is preferable because excitation of the second excitation slit 22*b* is likely to occur.

Also, a distance D21 in the first direction X between the second feed line 32 and the second intermediate ground member 22 (the conductor piece A21, the conductor piece A22, the conductor piece A23, and the conductor piece A24) may be shorter than a distance D22 in the thickness direction Z between the second feed line layer L2 and the ground member 40 (the upper ground member 41) in the thickness direction Z (also see FIG. 3). According to this configuration, the strength of the electromagnetic field formed by the coplanar line consisting of the second feed line 32 and the second intermediate ground member 22 is greater than the strength of the electromagnetic field formed in the microstrip line consisting of the second feed line 32 and the ground member 40. Therefore, the radiation efficiency of the antenna substrate 1 can be increased. Also, when the distance in the first direction X between the second feed line 32 and the second intermediate ground member 22 is not constant, an average value of the distance may be defined as the distance D21. Also, the second feed line 32 and the second intermediate ground member 22 are located in the same layer (the second feed line layer L2), and therefore the second excitation slit 22*b* can be efficiently excited.

Also, a width (a dimension in the second direction Y) D23 of the second excitation slit 22*b* may be narrower than a width (a dimension in the first direction X) D24 of the second line slit 22*a*. According to this configuration, the radiation efficiency of the antenna substrate 1 can be further increased. Also, a length (a dimension in the second direction Y) D25 of the second feed line 32 may be longer than a dimension D26 of each of the conductor pieces A21 to A24 in the second direction Y. According to this configuration, the radiation efficiency of the antenna substrate 1 can be further increased.

Also, a distance D30 between the second antenna 12 and the first feed line layer L1 in the thickness direction Z may be greater than a distance D12 between the first feed line layer L1 and the ground member 40 (the upper ground member 41) in the thickness direction Z (see FIG. 3). According to this configuration, the intermediate ground members 21 and 22 can be away from the antennas 11 and 12 in the thickness direction Z and the band of electromagnetic waves that can be transmitted and received by the antenna substrate 1 can be expanded. Also, for example, a sum of thicknesses (dimensions in the thickness direction Z) of the insulating layers 106 and 107 located above the first feed line layer L1 may be greater than or equal to twice a sum of thicknesses of the insulating layers 104 and 105 located between the ground member 40 and the first feed line layer L1 such that the distance D30 is larger than the distance D12. Also, dielectrics having different dielectric constants may be used in the insulating layers 106 and 107 and the insulating layers 104 and 105.

Hereinafter, a path along which the feed element 60 supplies an electric current to the feed lines 31 and 32 will be described. Also, as the feed element 60, for example, a radio frequency integrated circuit (RFIC) or the like can be used. The feed element 60 according to the present embodiment is mounted on the lower surface of the second ground member 50 provided on the lower surface of the first insulating layer 101.

Figure 6:
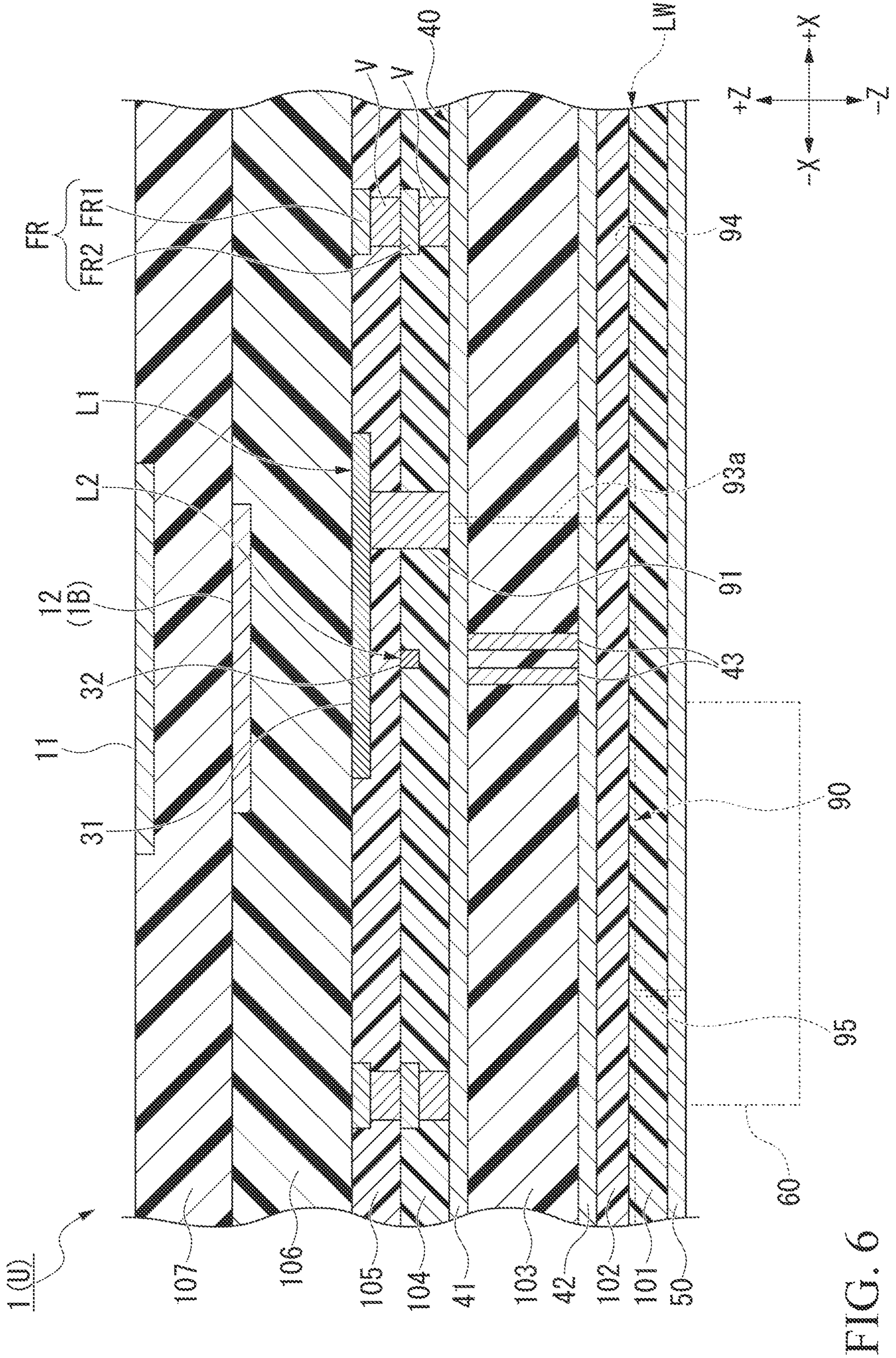
FIG. 6 is a cross-sectional view taken along line VI-VI shown in FIG. 2.

As shown in FIG. 6, in the present embodiment, the first feed line 31 and the feed element 60 are electrically connected via the wiring path 90. Although not shown, likewise, the second feed line 32 and the feed element 60 are electrically connected via the wiring path 90. The wiring path 90 according to the present embodiment includes a first feed via 91, a second feed via 92 (not shown in FIG. 6) (see FIG. 5), a first upper wiring via 93*a*, a second upper wiring via 93*b* (not shown), a wiring pattern 94, and a lower wiring via 95. As shown in FIGS. 4 and 6, the first feed via 91 is a via which is in contact with the first feed line 31. As shown in FIG. 6, the first feed via 91 penetrates the fourth insulating layer 104 and the fifth insulating layer 105 in the thickness direction Z. The first upper wiring via 93*a* is a via connected to the lower end of the first power supply via 91 and extending downward. The first upper wiring via 93*a* penetrates from the ground member 40 to the second insulating layer 102 in the thickness direction Z. Also, as shown in FIG. 5, the second feed via 92 is a via which is in contact with the second feed line 32. Although not shown, the second upper wiring via 93*b* is a via connected to the lower end of the second feed via 92 and extending downward. Like the first upper wiring via 93*a*, the second upper wiring via 93*b* penetrates from the ground member 40 to the second insulating layer 102 in the thickness direction Z (not shown). The lower wiring via 95 is a via connected to the feed element 60 and extending upward.

The wiring pattern 94 is a pattern formed by a conductor. As shown in FIG. 6, the wiring pattern 94 is located in the wiring layer LW. Here, the ground member 40 is arranged to be located between the wiring layer LW and the feed line layers L1, L2 in the thickness direction Z. That is, the wiring layer LW is located below the ground member 40. More specifically, the wiring layer LW according to the present embodiment is located between the first insulating layer 101 and the second insulating layer 102 in the thickness direction Z.

The wiring pattern 94 provided in the wiring layer LW plays a role in electrically connecting the lower wiring via 95 and each of the upper wiring vias 93*a* and 93*b* provided in each antenna unit U included in the antenna substrate 1. In other words, the wiring pattern 94 plays a role in connecting one feed element 60 and the feed lines 31 and 32 provided in each of the plurality of antenna units U. Thus, one feed element 60 and a plurality of feed lines 31 and 32 can be easily connected by providing the wiring pattern 94 in the wiring layer LW located below the ground member 40.

Also, a configuration in which the antenna substrate 1 includes two wiring layers LW, the wiring pattern 94 connecting the feed element 60 and each first feed line 31 is arranged on one wiring layer LW, and the wiring pattern 94 connecting the feed element 60 and each second feed line 32 is arranged on the other wiring layer LW may be adopted. In this case, crosstalk of the electric current supplied to the feed lines 31 and 32 can be suppressed.

Next, the operation and effects of the antenna substrate 1 configured as described above will be described.

As described above, in the antenna substrate 1 according to the present embodiment, the excitation slits 21*b* and 22*b* can be excited by supplying an electric current to the feed lines 31 and 32 using the feed element 60. Thereby, electromagnetic waves can be generated at the excitation slits 21*b* and 22*b* and electromagnetic waves can be emitted from the antennas 11 and 12. At this time, some of the electromagnetic waves generated in the excitation slits 21*b* and 22*b* propagate downward.

Further, in the antenna substrate 1 according to the present embodiment, the intermediate ground members 21 and 22 are located between the antennas 11, 12 and the ground member 40 in the thickness direction Z. That is, the ground member 40 is provided below the intermediate ground members 21 and 22. According to this configuration, electromagnetic waves propagated downward from the excitation slits 21*b* and 22*b* are reflected by the ground member 40. Therefore, leakage of the electromagnetic waves downwardly from the antenna substrate 1 is suppressed. Also, in the antenna substrate 1 according to the present embodiment, the feed line 31 or 32 and the intermediate ground member 21 or 22 are located in the same layer (the feed line layer L1 or L2). Thus, for example, an increase in the thickness of the antenna substrate 1 can be suppressed as compared with the configuration in which a new ground member is added below the feed line layer in the antenna substrate described in Patent Document 1.

Also, the antenna substrate 1 according to the present embodiment has the two feed line layers L1 and L2. According to this configuration, for example, electromagnetic waves for V polarization can be generated from one of the two excitation slits 21*b* and 22*b*, and electromagnetic waves for H polarization can be generated from the other. That is, the antenna substrate 1 can be used with both V and H polarizations. Although the first feed line layer L1 and the first antenna 11 are associated and the second feed line layer L2 and the second antenna 12 are associated in the present embodiment, the first feed line layer L1 may be associated with the second antenna 12 and the second feed line layer L2 may be associated with the first antenna 11 or both the first antenna 11 and the second antenna 12 may be associated with both the first feed line layer L1 and the second feed line layer L2. Alternatively, the antenna substrate 1 may include only one antenna and both the two feed line layers L1 and L2 may be associated with the one antenna. Also, in cases where it is not necessary to use the antenna substrate 1 in both polarizations or the like, the antenna substrate 1 may have only one feed line layer.

As described above, the antenna substrate 1 according to the present embodiment includes the antennas 11 and 12, the ground member 40 arranged at intervals from the antennas 11 and 12 in the thickness direction Z, and the feed line layers L1 and L2 located between the antennas 11, 12 and the ground member 40 in the thickness direction Z. The intermediate ground member 21 or 22 electrically connected to the ground member 40 and the feed line 31 or 32 are arranged on the feed line layer L1 or L2. The line slit 21*a* or 22*a* extending in a direction orthogonal to the thickness direction Z and the excitation slit 21*b* or 22*b* extending in a direction orthogonal to both the direction in which the line slit 21*a* or 22*a* extends and the thickness direction Z are formed in the intermediate ground member 21 or 22. In the feed line layer L1 or L2, the feed line 31 or 32 is located inside of the line slit 21*a* or 22*a*. In the feed line layer L1 or L2, the excitation slit 21*b* or 22*b* extends to intersect the feed line 31 or 32.

According to this configuration, because the excitation slits 21*b* and 22*b* extend to intersect the feed lines 31 and 32, the excitation slits 21*b* and 22*b* can be excited by supplying the electric currents of the feed lines 31 and 32 and electromagnetic waves can be generated. Here, when some of the electromagnetic waves generated by the excitation slit 21*b* or 22*b* propagate toward the opposite side of the antenna 11 or 12, the electromagnetic waves are reflected by the ground member 40. Therefore, it is possible to suppress the leakage of electromagnetic waves to the outside of the antenna substrate 1. Also, because the feed line 31 or 32 and the intermediate ground member 21 or 22 are located in the same layer (the feed line layer L1 or L2), an increase in the thickness of the antenna substrate 1 can be suppressed.

Also, in the feed line layer L1 or L2, the excitation slit 21*b* or 22*b* penetrates the intermediate ground member 21 or 22. According to this configuration, the radiation efficiency of the antenna substrate 1 can be increased.

Also, in the feed line layer L1 or L2, the line slit 21*a* or 22*a* penetrates the intermediate ground member 21 or 22. According to this configuration, the radiation efficiency of the antenna substrate 1 can be further increased.

Also, the antenna substrate 1 according to the present embodiment includes the two feed line layers L1 and L2. According to this configuration, for example, the antenna substrate 1 can be used with both V and H polarizations.

Also, the distance D30 between the second antenna 12 and the first feed line layer L1 in the thickness direction Z is longer than the distance D12 between the first feed line layer L1 and the ground member 40 in the thickness direction Z. According to this configuration, the intermediate ground member 21 or 22 is away from the antenna 11 or 12 in the thickness direction Z and the band of electromagnetic waves that can be transmitted and received by the antenna substrate 1 can be expanded.

Also, in the feed line layer L1 or L2, the distance D11 or D21 between the feed line 31 or 32 and the intermediate ground member 21 or 22 is shorter than the distance D12 or D22 between the feed line layer L1 or L2 and the ground member 40 in the thickness direction Z. According to this configuration, the strength of the electromagnetic field formed in the coplanar line consisting of the feed line 31 or 32 and the intermediate ground member 21 or 22 is greater than the strength of the electromagnetic field formed in the microstrip line consisting of the feed line 31 or 32 and the ground member 40. Therefore, the radiation efficiency of the antenna substrate 1 can be increased more reliably.

Also, the antenna substrate 1 according to the present embodiment further includes the feed element 60 configured to supply an electric current to the feed lines 31 and 32, the wiring path 90 configured to electrically connect the feed element 60 and the feed lines 31 and 32, and the wiring layer LW. The ground member 40 is arranged to be located between the feed line layers L1, L2 and the wiring layer LW in the thickness direction Z. At least a part of the wiring path 90 (the wiring pattern 94) is arranged in the wiring layer LW. According to this configuration, one feed element 60 and a plurality of feed lines 31 and 32 can be easily connected.

Also, the technical scope of the present invention is not limited to the above embodiment and various modifications can be made within the scope of the present invention defined in the claims.

For example, a position, a size, and a shape of the notch 21*d* or 22*d* formed in the intermediate ground member 21 or 22 can be changed as appropriate. By changing the positions, sizes, and shapes of the notch 21*d* and the notch 22*d*, the frequency of electromagnetic waves that can be transmitted and received by the antenna substrate 1 can be changed.

Also, the position of the first feed via 91 in the first direction X can be changed as appropriate. Likewise, the position of the second feed via 92 in the second direction Y can be changed as appropriate. By changing the positions of the feed vias 91 and 92, the impedance values of the feed lines 31 and 32 can be changed. In the present embodiment, the first feed via 91 is located between one end of the feed line 31 and the midpoint of the feed line 31 in the first direction X, and the second feed via 92 is located between one end of the feed line 32 and the midpoint of the feed line 32 in the second direction Y.

Also, a configuration in which the wiring pattern 94 and each first feed line 31 are electrically connected is not limited to the example of the above embodiment. For example, the first feed via 91 may extend to the wiring pattern 94.

Likewise, a configuration in which the wiring pattern 94 and each second feed line 32 are electrically connected is not limited to the example of the above embodiment. For example, the second feed via 92 may extend to the wiring pattern 94.

Also, the antenna substrate 1 may have three or more feed line layers. Likewise, the antenna substrate 1 may have three or more antennas. Here, the feed line layer farthest from the ground member 40 in the thickness direction Z among the plurality of feed line layers is referred to as a top feed line layer LT and the antenna closest to the ground member 40 in the thickness direction Z among the plurality of antennas is referred to as a bottom antenna 1B. In the above-described embodiment, the first feed line layer L1 corresponds to the top feed line layer LT and the second antenna 12 corresponds to the bottom antenna 1B. Here, the distance between the bottom antenna 1B and the top feed line LT in the thickness direction Z may be longer than the distance between the top feed line layer LT and the ground member 40 in the thickness direction Z. In this case, as in the case where the distance D30 is longer than the distance D12 in the above-described embodiment (see FIG. 3), the band of electromagnetic waves that can be transmitted and received by the antenna substrate 1 can be expanded. Also, by applying a dimensional relationship described in the above embodiment to each feed line layer, operations and effects similar to those of the above embodiment can be obtained.

Also, the number of antenna units U provided in the antenna substrate 1 can be appropriately changed, and may be any number if the number of antenna units U is one or more.

In addition, within the scope of the present invention defined in the claims, it is possible to appropriately replace the components in the above-described embodiments with well-known components, and the above-described embodiments and modified examples may be appropriately combined.

REFERENCE SIGNS LIST

1 Antenna substrate
11 First antenna (antenna)
12 Second antenna (antenna)
1B Bottom antenna
21 First intermediate ground member (intermediate ground member)
21*a* First line slit (line slit)
21*b* First excitation slit (excitation slit)
22 Second intermediate ground member (intermediate ground member)
22*a* Second line slit (line slit)
22*b* Second excitation slit (excitation slit)
31 First feed line (feed line)
32 Second feed line (feed line)
40 Ground member
60 Feed element
90 Wiring path
L1 First feed line layer (feed line layer)
L2 Second feed line layer (feed line layer)
LT Top feed line Layer
LW Wiring layer
Z Thickness direction

The invention claimed is:

1. An antenna substrate comprising:
at least one antenna;
a ground member arranged at an interval from each of the at least one antenna in a thickness direction; and
at least one feed line layer located between each of the at least one antenna and the ground member in the thickness direction,
wherein an intermediate ground member electrically connected to the ground member and a feed line are arranged on each of the at least one feed line layer,
wherein an excitation slit extending in a direction orthogonal to the thickness direction and a line slit extending in a direction orthogonal to both the direction in which the excitation slit extends and the thickness direction are formed in the intermediate ground member,
wherein, in each of the at least one feed line layer, the feed line and the line slit are coplanar, and the feed line is located inside of the line slit, and
wherein, in each of the at least one feed line layer, the excitation slit extends to intersect the feed line as seen in the thickness direction.

2. The antenna substrate according to claim 1, wherein, in each of the at least one feed line layer, the excitation slit extends to penetrate the intermediate ground member.

3. The antenna substrate according to claim 1, wherein, in each of the at least one feed line layer, the line slit extends to penetrate the intermediate ground member.

4. The antenna substrate according to claim 1, comprising two or more of the feed line layers.

5. The antenna substrate according to claim 4, wherein the line slit in a first feed line layer and the excitation slit in a second feed line layer are in parallel and are overlapped in a plain view.

6. The antenna substrate according to claim 1, wherein, when an antenna closest to the ground member in the thickness direction in the at least one antenna is referred to as a bottom antenna and a feed line layer farthest from the ground member in the thickness direction in the at least one feed line layer is referred to as a top feed line layer, a distance between the bottom antenna and the top feed line layer in the thickness direction is longer than a distance between the top feed line layer and the ground member in the thickness direction.

7. The antenna substrate according to claim 1, wherein, in each of the at least one feed line layer, a distance between the feed line and the intermediate ground member is shorter than a distance between each of the at least one feed line layer and the ground member in the thickness direction.

8. The antenna substrate according to claim 1, further comprising:
a feed element configured to supply an electric current to the feed line;
a wiring path configured to electrically connect the feed element and the feed line; and
a wiring layer,
wherein the ground member is arranged to be located between the wiring layer and each of the at least one feed line layer in the thickness direction, and
wherein at least a part of the wiring path is arranged on the wiring layer.

* * * * *